United States Patent [19]

Makise et al.

[11] Patent Number: 5,559,643
[45] Date of Patent: Sep. 24, 1996

[54] APPARATUS FOR RECORDING A DIGITAL SIGNAL ONTO A RECORDING MEDIUM AT ONE OF A PLURALITY OF DATA RECORDING RATES

[75] Inventors: Tetsuro Makise; Teruyuki Yoshida, both of Kanagawa, Japan

[73] Assignee: Sony Corporation, Tokyo, Japan

[21] Appl. No.: 394,261

[22] Filed: Feb. 24, 1995

[30] Foreign Application Priority Data

Feb. 28, 1994 [JP] Japan .................................. 6-030522

[51] Int. Cl.$^6$ ........................................................ G11B 5/09
[52] U.S. Cl. ............................ 360/46; 360/66; 360/8; 360/25
[58] Field of Search .................................. 360/46, 66, 8, 360/65, 39, 41, 25

[56] References Cited

U.S. PATENT DOCUMENTS

| | | | |
|---|---|---|---|
| 4,454,548 | 6/1984 | Makise | 360/66 |
| 5,045,954 | 9/1991 | Oishi et al. | 360/8 |
| 5,223,990 | 6/1993 | Yoshida et al. | 360/65 |
| 5,291,344 | 3/1994 | Pehl | 360/46 |
| 5,351,155 | 9/1994 | Ishii | 360/46 |
| 5,483,390 | 1/1996 | Jaffard | 360/46 |

*Primary Examiner*—Aristotelis Psitos
*Assistant Examiner*—Alan Faber
*Attorney, Agent, or Firm*—William S. Frommer; Alvin Sinderbrand

[57] ABSTRACT

A data recording apparatus for recording a digital signal onto a magnetic recording medium at one of a plurality of data recording rates. The apparatus comprises a detection device for detecting a change in value of the digital signal, a first variable current source for generating a first current having a value which is varied in response to a data rate of the digital signal, a second variable current source for generating a second current, a recording head for recording the signal into the magnetic recording medium, a current output device for outputting the second current or an added value of the first current and the second current in response to detection results of the detection device, and a recording head driving device for driving the recording head in response to an output of the current output device and the digital signal so as to enable recording at a desired data rate.

7 Claims, 5 Drawing Sheets

APPARATUS FOR RECORDING A DIGITAL SIGNAL ONTO A RECORDING MEDIUM AT ONE OF A PLURALITY OF DATA RECORDING RATES

BACKGROUND OF THE INVENTION

1. Field of the Invention

This invention relates to a data recording apparatus having a variable recording speed for data.

2. Description of the Related Art

A data recording apparatus for recording digital data onto a magnetic tape as a recording medium has been conventionally known, such as, a data recording apparatus for recording data with high density using a digital video tape recorder of helical scan system.

FIG. 1 schematically shows the structure of a recording system of the above-described data recording apparatus. A signal processing circuit 6 treats data entered from an input terminal with signal processing for recording, and outputs the resulting signal as a digital recording signal to a recording amplifier 10. Speed information and a recording current for the digital recording signal are also entered to the recording amplifier 10 from a control circuit 7. The recording amplifier 10, which is a signal waveform shaping unit for recording data with the same characteristics at different speeds, is constituted by a class A linear amplifier. Frequency characteristics of a filter unit of this recording amplifier 10 are switched in response to the data rate.

In this recording amplifier 10, the input digital recording signal is transmitted to one of plural filters $22_1, 22_2, \ldots, 22_n$ in a filter unit 22. The filters $22_1, 22_2, \ldots, 22_n$ in the filter unit 22 are adapted for speed information fed from the control circuit 7. For example, the 1/1-tuple speed filter $22_1$ is adapted for a digital recording signal of normal data rate, that is, 1/1-tuple speed. The 1/2-tuple speed filter $22_2$ is adapted for a digital recording signal of a data rate 1/2 times the normal data rate. The 1/n-tuple filter $22_n$ is adapted for a digital recording signal of a data rate 1/n times the normal data rate. The filters $22_1, 22_2, \ldots, 22_n$ in the filter unit 22 are correspondingly connected to fixed terminals $23_1, 23_2, \ldots, 23_n$ in a signal changeover switch 23, respectively.

In the signal changeover switch 23, the fixed terminals $23_1, 23_2, \ldots, 23_n$ are switched in accordance with the speed information, that is, the data rate selected and transmitted by the control circuit 7. The digital recording signal passing through the filter of the filter unit 22 connected to the selected fixed terminal is outputted through the signal changeover switch 23 to a class A amplifier 24.

The class A amplifier 24, supplied with the recording current from the control circuit 7, shapes a waveform of the input digital recording signal. The digital recording signal having its waveform shaped is outputted from the recording amplifier 10, and is recorded through a rotary transducer 8 into a magnetic recording medium, such as, a magnetic tape 30, by a recording head 9 rotated at a speed corresponding to the currently selected data rate.

In the above-described data recording apparatus, the rotation speed of the recording head 9 and the running speed of the magnetic tape 30 are controlled, so that data of variable data rate is recorded and reproduced. Specifically, the running speed of the magnetic tape 30 and the rotation speed of the recording head 9 are variably controlled to 1/1, 1/2, 1/4, 1/16 and 1/24 times the normal speed, so that information data having data rates of 88, 44, 22, 11, 5.50 and 3.67 Mbps, that is, a digital recording signal having maximum frequencies 44, 22, 11, 5.50, 2.75 and 1.84 MHz can be recorded and reproduced. That is, the information data recorded with the digital recording signal having the data rate of 88 Mbps, that is, the maximum frequency of 44 MHz, can be read out as information data having the data rate of 44 Mbps, that is, the maximum frequency of 22 MHz, when the speeds of the magnetic tape 30 and the recording head 9 are controlled to 1/2 times the normal speed. Thus, 1/2-tuple speed low-speed reproduction can be carried out.

The waveform of data before passing through the filter unit 22 is now described. FIG. 2A shows a waveform with 1/1-tuple data rate. FIG. 2C shows a waveform with 1/2-tuple data rate. FIG. 2E shows a waveform with 1/n-tuple data rate. FIGS. 2B, 2D and 2F show waveforms of the digital recording signal after passing the data through the filter unit corresponding to FIGS. 2A, 2C and 2E, respectively. As shown in FIGS. 2B, 2D and 2F, the same waveforms are produced by passing the data through the filter unit. Thus, the same waveform can be produced by passing a digital recording signal of any data rate through the filter unit 22.

FIG. 3 shows frequency characteristics of the filters in the filter unit 22. For example, frequency characteristics of the 1/1-tuple speed filter $22_1$ for a digital recording signal having 1/1-tuple data rate, that is, frequency $f_0$, are indicated by $RT_1$. Enhancement is carried out in a frequency band indicated by P. That is, frequency characteristics of the recording current with the 1/1-tuple data rate are such that decremented high frequency band is compensated by capacities of an output stage of the class A amplifier 24, wiring, the rotary transducer 8 and the recording head 9, inductance by the recording head 9 and wiring, and dumping resistance for restricting the resonance thereof.

Frequency characteristics of the 1/2-tuple speed filter $22_2$ for a digital recording signal having 1/2-tuple data rate, that is, frequency $f_0/2$, are indicated by $RT_2$. Frequency characteristics of the speed filter for a digital recording signal having 1/4-tuple data rate, that is, frequency $f_0/4$, are indicated by $RT_3$. Frequency characteristics of the speed filter for a digital recording signal having 1/8-tuple data rate, that is, frequency $f_0/8$, are indicated by $RT_4$. Each filter also carries out peak shift correction.

Meanwhile, the recording amplifier 10 is the class A linear amplifier, and therefore consumes a large quantity of electric power.

In addition, the recording amplifier 10 requires the number of filters corresponding to the number of types of data rates. The filters of the filter unit 22 have high operation frequencies, and cannot be constituted by active filters. Therefore, the circuit scale is enlarged.

Thus, it is difficult to realize continuous variable speed.

SUMMARY OF THE INVENTION

In view of the above-described status of the art, it is an object of the present invention to provide a data recording apparatus which is capable of realizing continuous variable speed with a smaller quantity of power.

According to the present invention, there is provided a data recording apparatus for recording a digital signal into a magnetic recording medium comprising: detection means for detecting variance of value of the digital signal; first current generating means for generating a first current with its value varied in response to data rate of the digital signal; second current generating means for generating a second current; a recording head for recording the signal into the magnetic recording medium; current output means for outputting the first current or an added value of the first current and the second current in response to detection results of the detection means; and recording head driving means for driving the recording head in response to an output of the current output means and the digital signal.

Also, in the data recording apparatus, the first current generating means generates a current with its value increased as the data rate of the digital signal is raised.

In addition, in the data recording apparatus, the recording head driving means has a transducer and switch means for supplying to the transducer a current with its polarity differing in response to the value of the digital signal.

DETAILED DESCRIPTION OF THE PREFERRED EMBODIMENTS

Figure 1:
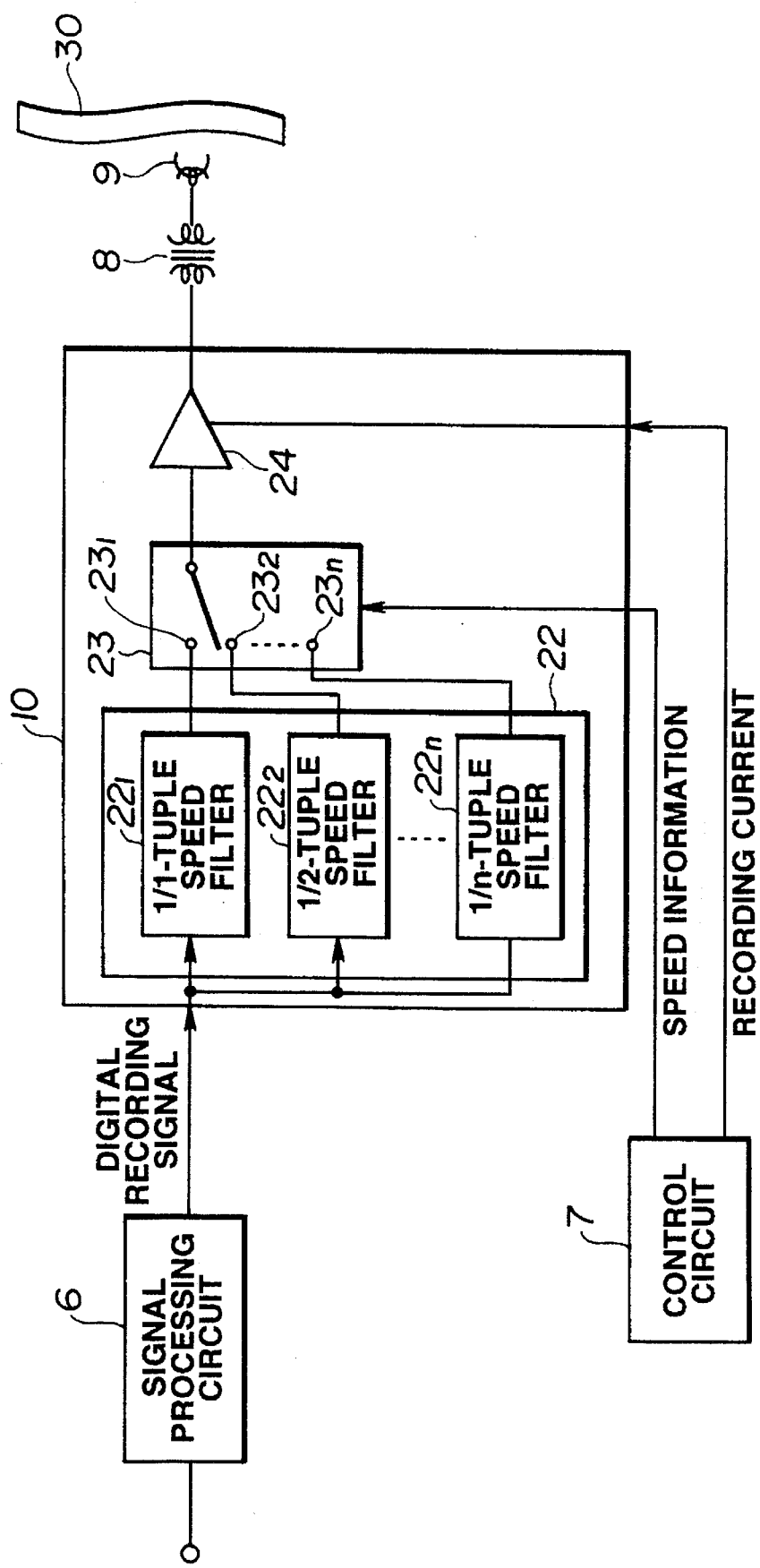
FIG. 1 is a block diagram showing a conventional data recording apparatus.
Figure 2A:
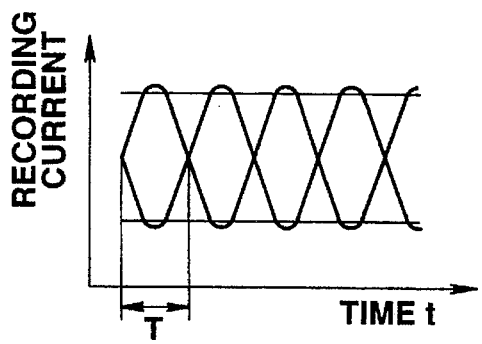
FIG. 2A shows a waveform of an output of a signal processing circuit shown in FIG. 1 in operation at 1/1-tuple speed.
Figure 2B:
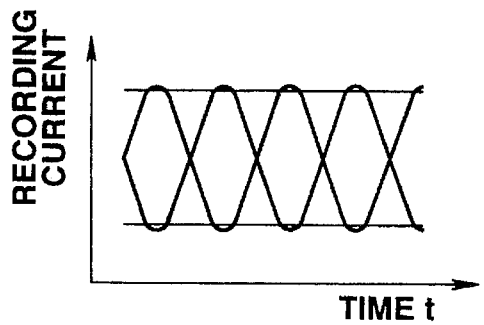
FIG. 2B shows a waveform of an output of a filter shown in FIG. 1 in operation at 1/1-tuple speed.
Figure 2C:
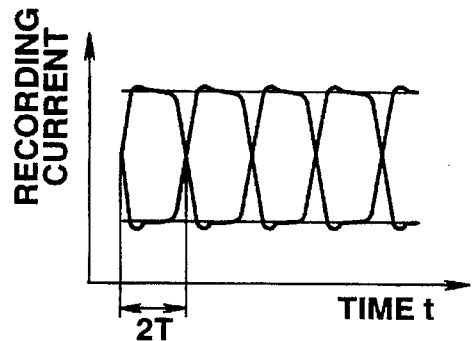
FIG. 2C shows a waveform of an output of the signal processing circuit shown in FIG. 1 in operation at 1/2-tuple speed.
Figure 2D:
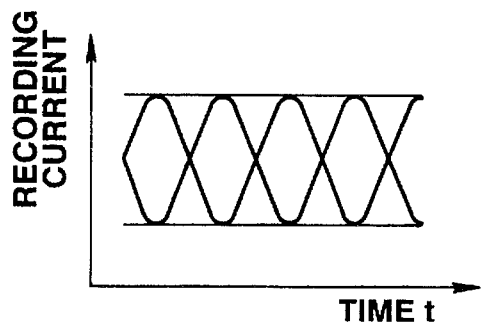
FIG. 2D shows a waveform of an output of the filter shown in FIG. 1 in operation at 1/2-tuple speed.
Figure 2E:
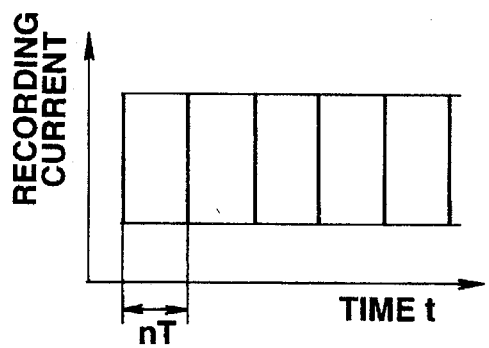
FIG. 2E shows a waveform of an output of the signal processing circuit shown in FIG. 1 in operation at 1/n-tuple speed.
Figure 2F:
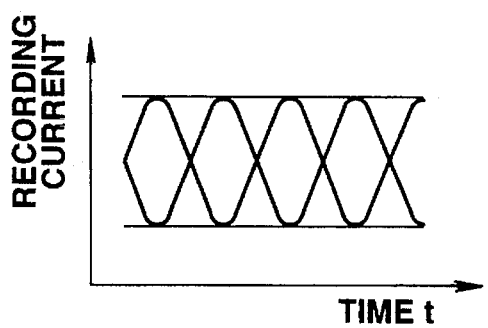
FIG. 2F shows a waveform of an output of the filter shown in FIG. 1 in operation at 1/n-tuple speed.
Figure 3:
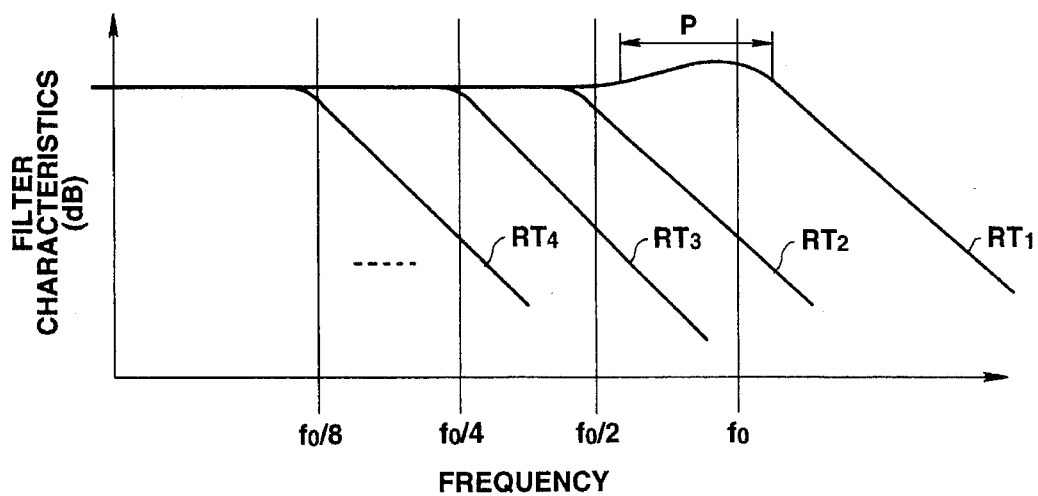
FIG. 3 is a view showing frequency characteristics of each filter shown in FIG. 2.
Figure 4:
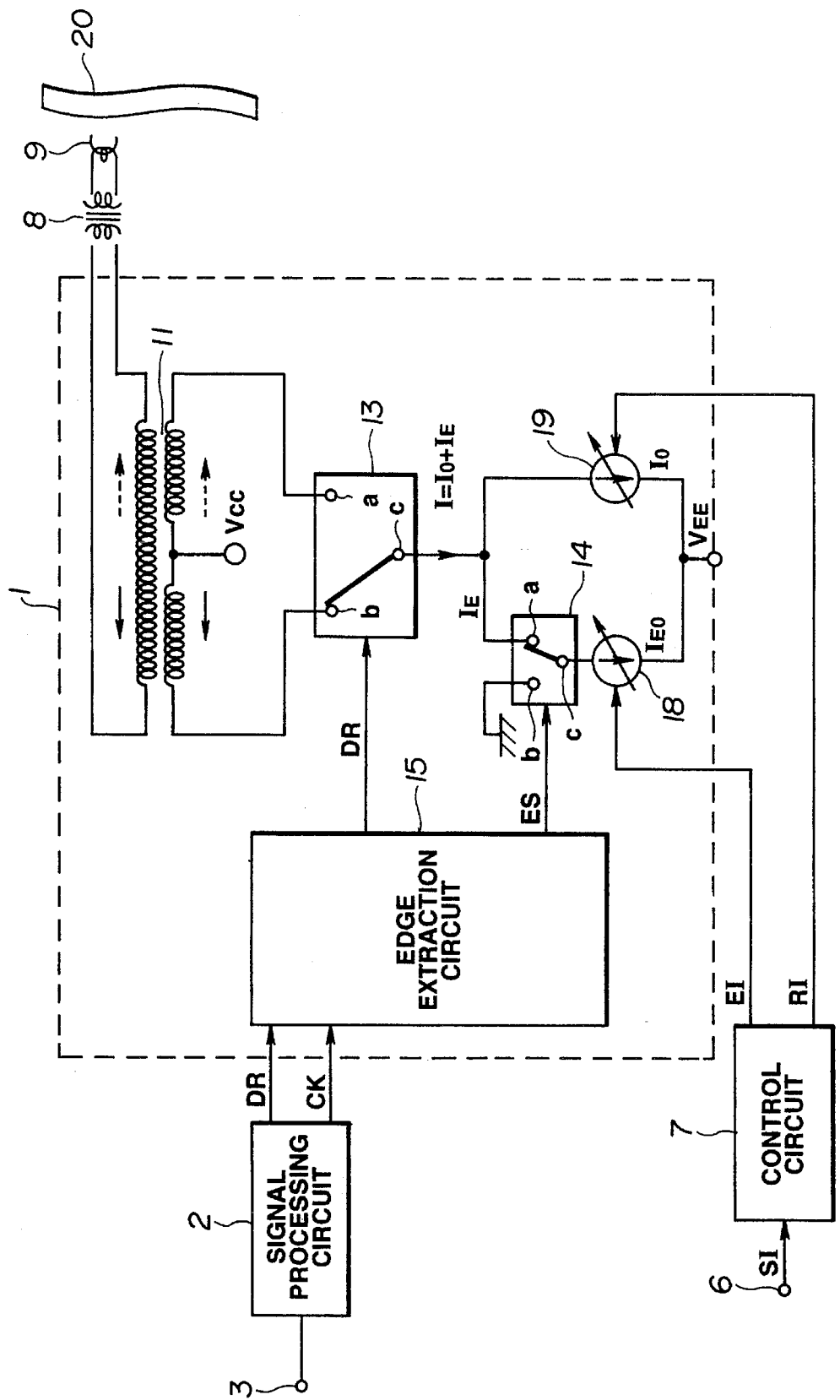
FIG. 4 is a block diagram showing a data recording apparatus according to the present invention.

A preferred embodiment of the present invention will now be described with reference to FIGS. 4 and 5A to 5F. As shown in FIG. 4, the data recording apparatus has a signal processing circuit 2, a recording amplifier 1, a control circuit 7, a rotary transducer 8, and a recording head 9. The recording amplifier 1 has an edge extraction circuit 15, a transducer 11, changeover switches 13, 14, and variable current sources 18, 19.

Figure 5A:
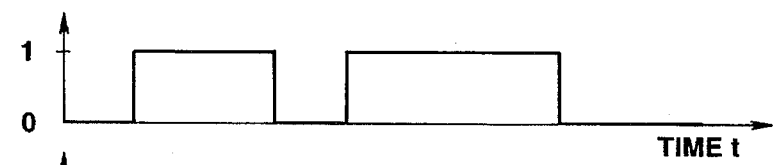
FIG. 5A is a view showing a digital recording signal DR of FIG. 4.
Figure 5B:
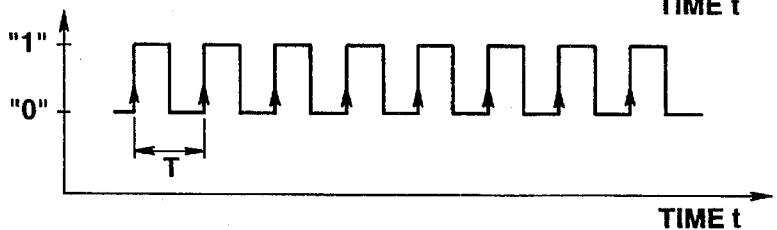
FIG. 5B is a view showing a clock signal CK of FIG. 4.
Figure 5C:
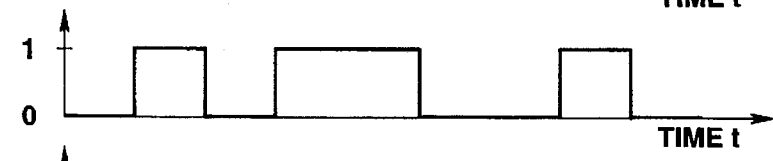
FIG. 5C is a view showing an edge signal ES of FIG. 4.
Figure 5D:
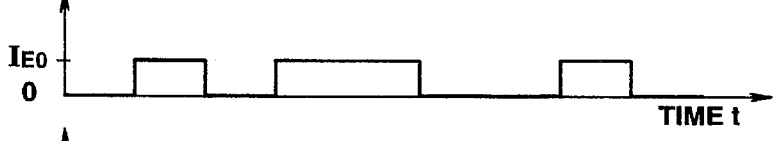
FIG. 5D is a view showing a current $I_{E0}$ of FIG. 4.
Figure 5E:
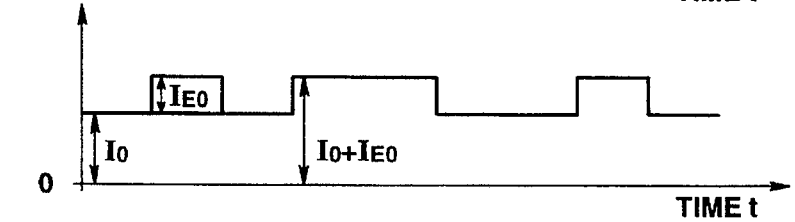
FIG. 5E is a view showing a current I of FIG. 4.

Operation of the data recording apparatus of the present embodiment will now be described with reference to FIGS. 4 and 5A to 5F. Data entered from an input terminal 3 is processed with signal processing for recording by the signal processing circuit 2, and is outputted as a digital recording signal DR from the signal processing circuit 2. Non return to zero (NRZ) modulation is conceivable as an example of the signal processing for recording. FIG. 5A shows the digital recording signal DR. The data entered from the input terminal 3 may be either analog data or digital data. A clock signal CK as shown in FIG. 5B in synchronization with the digital recording signal DR is also outputted from the signal processing circuit 2. The digital recording signal DR and the clock signal CK are entered to the edge extraction circuit 15 in the recording amplifier 1. The edge extraction circuit 15 operates with the clock signal CK, and extracts an edge signal ES indicating rise or fall of the digital recording signal DR on the basis of the clock signal CK. FIG. 5C shows this edge signal ES. The edge signal ES is transmitted to the switch 14. The switch 14 has a fixed contact a, a grounded fixed contact b and a movable contact c, so that the contacts are switched on the basis of the edge signal ES. The movable contact c of the switch 14 is supplied with a current $I_{E0}$ from the variable current source 18. FIG. 5D shows the current $I_{E0}$. The value of the current $I_{E0}$ is controlled in accordance with an edge current control signal EI from the control circuit 7. The edge current control signal EI is generated in accordance with data rate information SI entered through a terminal 8. The data rate information SI is designated by the user or set in accordance with the transfer speed of data transmitted from the host computer. With this edge current control signal EI, the current $I_{E0}$ outputted from the variable current source is controlled to be greater when the data rate indicated by the data rate information SI is high, and smaller when the data rate is low. Also, the value of the current $I_{E0}$ may be reduced to 0 when the data rate is low. A current $I_0$ is outputted from the variable current source 19. The value of the current $I_0$ is adjusted in response to a recording current control signal RI outputted from the control circuit 7. The value of the current $I_{E0}$ is adjusted in accordance with characteristics of the recording medium, such as a magnetic tape, and of the recording head. Thus, the current I supplied to the switch 13 is $I_0+I_{E0}$ when the movable contact c is connected to the fixed contact a, as shown in FIG. 5E. The current I supplied to the switch 13 is $I_0$ when the movable contact c is connected to the fixed contact b.

Figure 5F:
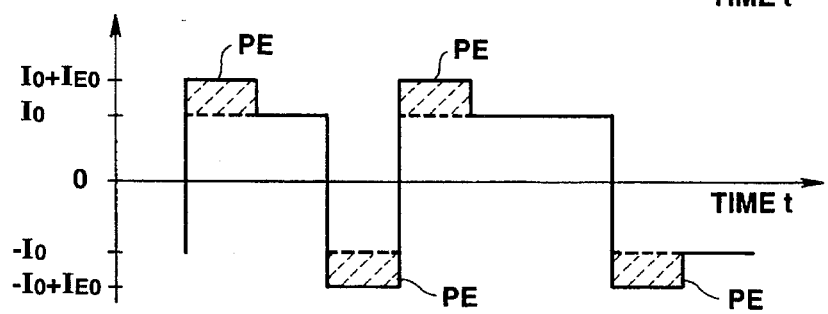
FIG. 5F is a view showing a current supplied to the recording head of FIG. 4.

The switch 13 has the fixed contacts a, b connected to the transducer 11 and the movable contact c connected to the variable current source 19. The switch 13 has its movable contact c controlled by the value of the digital recording signal DR. Thus, the recording current as shown in FIG. 5F is supplied from the transducer 11 to the rotary transducer 8. For example, when the value of the digital recording signal DR is "1", the movable contact c of the switch 13 is turned to the fixed contact a. When the value of the digital recording signal DR is "0", the switch 13 is turned to the fixed contact b. The transducer 11 drives the recording head 9, so that the digital recording signal DR having its high frequency region compensated is recorded into a recording medium, such as, a magnetic tape 20. When the movable contact c of the switch 13 is turned to the fixed contact a, the current flows in the direction indicated by a dotted line arrow. When the movable contact c of the switch 13 is turned to the fixed contact b, the current flows in the direction indicated by a solid line arrow. In FIG. 5F, the solid lines indicate the recording current, and the dotted slant lines indicate the current IE with the movable contact c of the switch 14 connected to the fixed contact a.

As is described above, the class A linear amplifier is not required in the present invention.

The present invention is described with reference to the data recorder with the rotary head in the above-described embodiment. However, the present invention is not limited to the above embodiment, and may be applied to a data recorder with a fixed head.

It is to be understood that various changes and modifications may be effected without departing from the scope of the present invention.

What is claimed is:

1. A data recording apparatus for recording a digital signal into a magnetic recording medium at one of a plurality of data recording rates, said apparatus comprising:

detection means for detecting a change in value of the digital signal;

first variable current generating means for generating a first current having a value which is varied in response to a data rate of the digital signal;

second variable current generating means for generating a second current;

a recording head for recording the signal into the magnetic recording medium;

current output means for outputting the second current or an added value of the first current and the second current in response to detection results of the detection means; and recording head driving means for driving the recording head in response to an output of the current output means and the digital signal so as to enable recording at a desired data rate.

2. The data recording apparatus as in claim 1, wherein the value of the first current is increased as the data rate of the digital signal is raised.

3. The data recording apparatus as in claim 1, wherein the recording head driving means includes a transformer and switch means for supplying to the transformer a current with its polarity differing in response to the value of the digital signal.

4. A data recording apparatus having a recording head for recording a signal onto a recording medium at one of a plurality of data recording rates, said apparatus comprising:

means for receiving an input signal and for processing the received input signal so as to form a digital data signal and a clock signal;

means, operative with said clock signal, for determining a change in value of said digital data signal;

means for generating first and second control signals;

first variable current generating means for generating a first current in accordance with said first control signal;

second variable current generating means for generating a second current in accordance with said second control signal;

switching means for selecting one of said second current and a combination of said first and second currents in accordance with an output from the determining means; and means for driving said recording head in response to said digital data signal and the selected one of said second current and a combination of said first and second currents from said switching means so as to enable recording at a desired data rate.

5. The data recording apparatus according to claim 4, wherein said first control signal is generated in accordance with said desired data rate.

6. The data recording apparatus according to claim 4, wherein the processing means processes the received input signal in accordance with a non-return-to-zero modulation technique.

7. The data recording apparatus according to claim 4, wherein said digital data signal has relatively high values and relatively low values and wherein said change in value occurs at a rise or fall of said digital data signal.

* * * * *